(12) United States Patent
Parry

(10) Patent No.: US 7,400,424 B2
(45) Date of Patent: Jul. 15, 2008

(54) PRINTER OPTION SUGGESTION METHOD AND PROGRAM

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 10/092,050

(22) Filed: Mar. 5, 2002

(65) Prior Publication Data
US 2003/0172086 A1  Sep. 11, 2003

(51) Int. Cl.
G06F 7/00 (2006.01)
G06F 17/00 (2006.01)
(52) U.S. Cl. .................. 358/1.15; 358/1.13; 347/19; 347/23; 399/8; 399/43; 399/85
(58) Field of Classification Search ............... 358/1.13, 358/1.15; 347/2, 19; 399/27, 8, 85, 43
See application file for complete search history.

(56) References Cited

U.S. PATENT DOCUMENTS

| | | | | |
|---|---|---|---|---|
| 4,556,959 A | * | 12/1985 | Allen et al. | 400/70 |
| 5,390,004 A | * | 2/1995 | Hopkins | 399/42 |
| 5,506,661 A | * | 4/1996 | Hanzawa | 399/1 |
| 5,572,672 A | * | 11/1996 | Dewitt et al. | 714/47 |
| 5,613,096 A | | 3/1997 | Danknick | |
| 5,692,111 A | | 11/1997 | Marbry et al. | |
| 5,699,495 A | | 12/1997 | Sniff | |
| 5,797,061 A | * | 8/1998 | Overall et al. | 399/27 |
| 5,905,906 A | | 5/1999 | Goffinet et al. | |
| 6,045,206 A | * | 4/2000 | Igval | 347/2 |
| 6,112,256 A | | 8/2000 | Goffinet et al. | |
| 6,124,938 A | | 9/2000 | Rabb et al. | |
| 6,453,127 B2 | * | 9/2002 | Wood et al. | 399/8 |
| 6,587,777 B1 | | 7/2003 | St. Pierre | |
| 6,615,276 B1 | | 9/2003 | Mastrianni et al. | |
| 6,738,841 B1 | | 5/2004 | Wolff | |
| 6,816,270 B1 | * | 11/2004 | Cooper et al. | 358/1.13 |
| 6,825,941 B1 | * | 11/2004 | Nguyen et al. | 358/1.15 |
| 6,865,564 B2 | * | 3/2005 | Parry | 706/45 |
| 6,909,519 B2 | * | 6/2005 | Parry | 358/1.13 |
| 6,915,273 B1 | * | 7/2005 | Parulski | 705/26 |
| 2002/0152296 A1 | | 10/2002 | Baker | |
| 2003/0065766 A1 | | 4/2003 | Parry | |

FOREIGN PATENT DOCUMENTS

EP     1128255     10/2001

OTHER PUBLICATIONS

Edge: Work-Group Computing Report, May 15, 2000, "HP extends network-printing leadership with enhancements to HP JetDirect Software Solutions", and Dialog Accession No. 02397817.

* cited by examiner

Primary Examiner—Mark Zimmerman
Assistant Examiner—Peter K Huntsinger

(57) ABSTRACT

A system and method for determining an optimal use of printing devices and printing device options in a network computer system or enterprise environment based upon typically usage characteristics of the printing devices and the options available to the printing devices.

20 Claims, 2 Drawing Sheets

PRINTER OPTION SUGGESTION METHOD AND PROGRAM

RELATED CASES

This application is related to U.S. patent application Ser. No. 09/967,576, filed Sep. 28, 2001 and entitled GEOGRAPHIC IMAGING DEVICE MANAGEMENT.

FIELD OF THE INVENTION

The present invention relates the optimization of printing devices in a network or enterprise system. More particularly, the present invention relates to the use of a program to identify printing device usage on a network system and suggest options for optimizing the use of the printing devices within the network system.

BACKGROUND OF THE INVENTION

The use and management of printing devices in enterprise environments is well known. Printing devices may include printers, copiers, scanners, multifunction devices, and the like. As fast as new printing devices are becoming available, so too are new methods and systems for managing the printing devices added to network computing systems. However, with new features and capabilities being added to printing devices on a daily basis, new management methods and tools are needed to keep pace with the rapidly changing technologies.

One well-known printer management system is the Web JetAdmin program offered by Hewlett-Packard®. Web JetAdmin provides a platform for a network administrator to manage network components from a central location or through a single computer capable of communicating with the network being controlled. Once installed on a network computer system, Web JetAdmin may be accessed from anywhere in the world through a web-browser having communication capabilities with the network computer system upon which Web JetAdmin is installed. The Web JetAdmin program therefore allows a network administrator to control and configure the printing devices of a network computer system from any location.

The Web JetAdmin program offers many features that may be used to set-up printing devices or monitor the status of printing devices connected to a network computer system. New printers may be installed on a network computer system and configured with the desired user settings using the Web JetAdmin program. The Web JetAdmin program also serves as a monitor for active printing devices and is capable of warning a network administrator of problems associated with the network printing devices. For instance, error messages associated with one or more printers in a network system may be broadcast to a network administrator through the Web JetAdmin program or interface. Common error messages include messages that may also be broadcast on a printing device, such as low-toner messages, empty paper tray messages, or paper jam messages. Web JetAdmin may also be used to search and organize the printing devices on a network into groups based upon criteria set by the network administrator. This provides the capability to monitor various printing devices according to usage variables, or configure user preferences according to printing device location or size.

The use of device management programs, such as Web JetAdmin, provide efficient tools for monitoring and operating multiple devices in enterprise environments. However, device management programs are traditionally limited to monitoring the available options incorporated with the network devices being monitored. In addition, the changes in network devices that may be made using the device management programs are limited to the available options currently associated with the network devices.

Network devices being produced today typically include numerous options and attachments that may be purchased with the network device, or added at a later date to upgrade the network device. Printing devices, and especially large printing devices used in enterprise situations, include numerous options for handling paper, services, or operations. For example, additional paper trays or larger capacity paper tray feeders may be added to a printing device to increase the printing capacity of the printing device. Additional service software and hardware may also be added to a printing device to alter the capabilities of a printing device. For instance, software that allows a printer/copier to perform scanning functions and save scanned images to a network server or other storage device may be added to a printing device as an option.

Although numerous options may be added to a printing device, the selection of options is usually based upon perceived need rather than actual need. Therefore, it may be desirable to provide a system and method for determining the actual need for printing device options in a network environment. Furthermore, it may be desirable to automate the option selection process with a system and method for determining and choosing the options that may optimize a particular printing device.

SUMMARY OF THE INVENTION

The present invention relates the optimization of printing devices in a network or enterprise system. More particularly, the present invention relates to the use of a program to identify printing device usage on a network system and suggest options for optimizing the use of the printing devices within the network system.

In one embodiment of the present invention an optimization program is provided for monitoring the usage of printing devices in network computer system and suggesting changes to the printing devices in order to optimize the use of the printing devices. The optimization program may obtain data from the printing devices or from another program that monitors the printing devices. The data may include usage data detailing the amount and types of use of each printing device, the available options for the various printing devices, and the installed options already used by the printing devices. Based upon the data received, the optimization program may determine ways to modify the printing devices in order to improve the functionality of the printing devices.

In an alternate embodiment of the present invention, the functions of the optimization program may be incorporated with a device management program for improving the capabilities of the device management program and suggesting options for improving the effectiveness of printing devices used with a network computer system. Combination with a device management program provides an improved system for managing printing devices.

The various embodiments of the present invention provide a network administrator, or other person tasked with optimizing the printing devices of a network computer system, a tool for determining the best options for altering the printing devices of a network computer system. The embodiments of the present invention help to remove some of the guesswork from decisions pertaining to adding or removing printing device options.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

The present invention relates the optimization of printing devices in a network or enterprise system. More particularly, the present invention relates to the use of a program to identify printing device usage on a network system and suggest options for optimizing the use of the printing devices within the network system.

Figure 1:
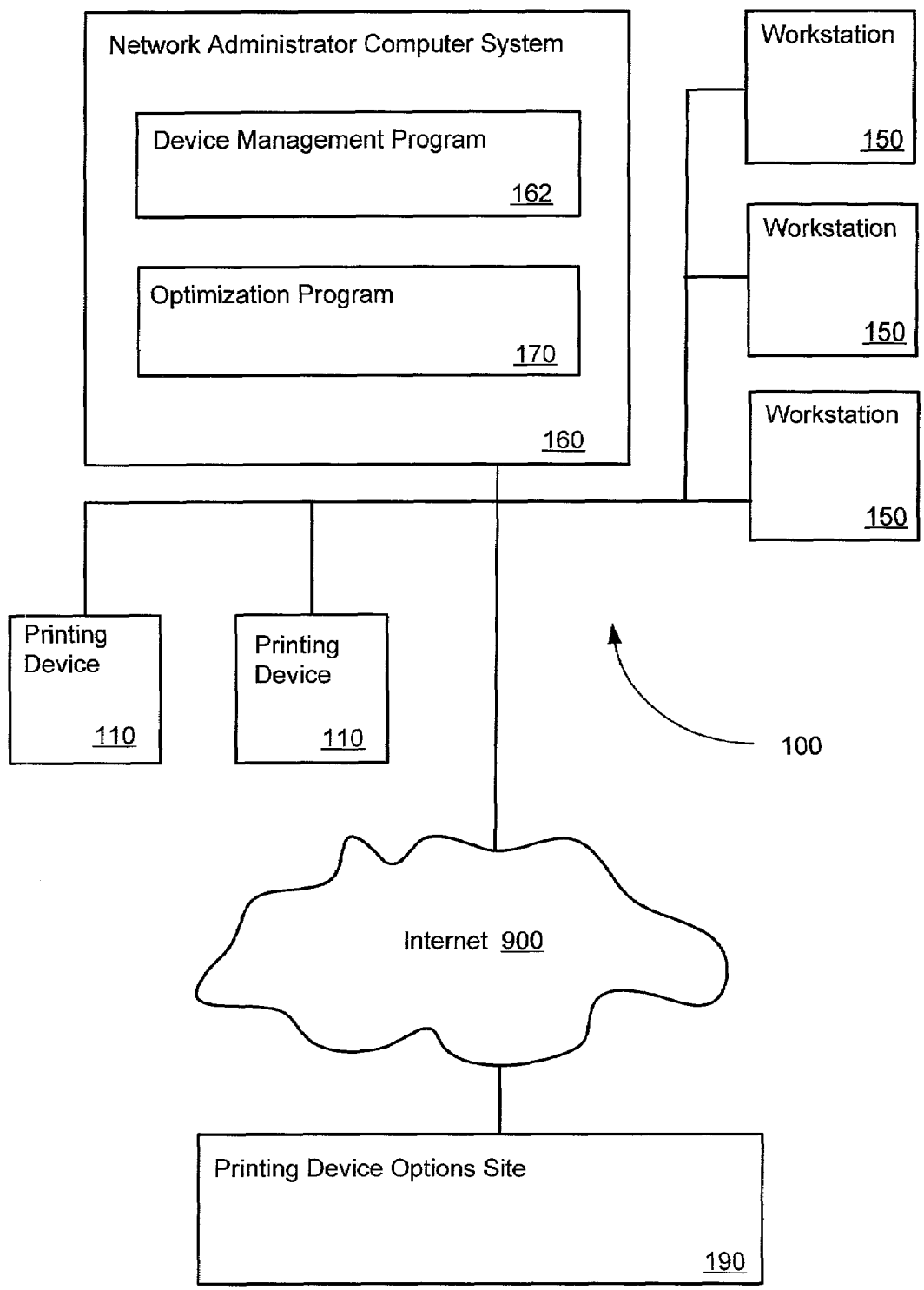
FIG. 1 illustrates a network computer system that may be used to carry out the various embodiments of the present invention.

A network computer system 100 that may be used to carry out the various embodiments of the present invention is illustrated in FIG. 1. Multiple network devices, including printing devices 110, workstations 150 and a network administrator computer system 160, may communicate over an intranet or network. The intranet, and hence the network devices, may also be capable of communicating with remote devices through an Internet 900 communication link.

Printing devices 110 may include devices such as printers, copiers, multifunction printing devices, and the like. Each of the printing devices 110 may be fitted with optional equipment to optimize the performance of the printing device 110 within the network computer system 100. Printing devices 110 may also include data stored in a memory of a printing device 110 that describes the options installed or available to the printing device 110.

Workstations 150 may include computers or other computing devices used by individuals across the network. Typically, a workstation 150 may include a computer system including one or more central processing units, memories, input devices, output devices, and storage devices, as known.

The network administrator computer system 160 may also include a computer system including one or more central processing units, memories, input devices, output devices, and storage devices. In most instances, the network administrator computer system 160 also includes one or more network device management programs 162 operating on the network administrator computer system 160. The network device management program 162 may be used to monitor, control, and analyze the various network devices and components that make up the network system 100. For instance, Hewlett-Packard's® Web JetAdmin program may operate on the network administrator computer system 160 for monitoring and controlling the printing devices 110 associated with the network system 100.

One or more remote computers 190 may also be connected to the Internet 900. A remote computer may host information about printing devices 110. For instance, the remote computer 190 may be a server operated by the manufacturer of printing devices 110. The server may host information about each of the printing devices 110 manufactured by the a particular company along with information, or data, about all of the available options that may be connected to or used with a particular printing device 110. Thus, the server could be queried to determine the available options for a particular printing device 110.

The present invention provides a computer program, or other system, for optimizing the performance of printing devices 110 connected to a network computer system 100 based upon the available options for each printing device 110. The program may work alone or in conjunction with other programs such as a device management program 162. Usage data may be retrieved from the printing devices 110, or another program, such as a device management program 162. Based upon the usage data for each individual printing device 110, the program may provide a network administrator with suggestions for adding options to the various printing devices 110. The program may determine the available options for a printing device 110 from the printing device 110 or from a remote computer 190 via an Internet 900 communication.

Figure 2:
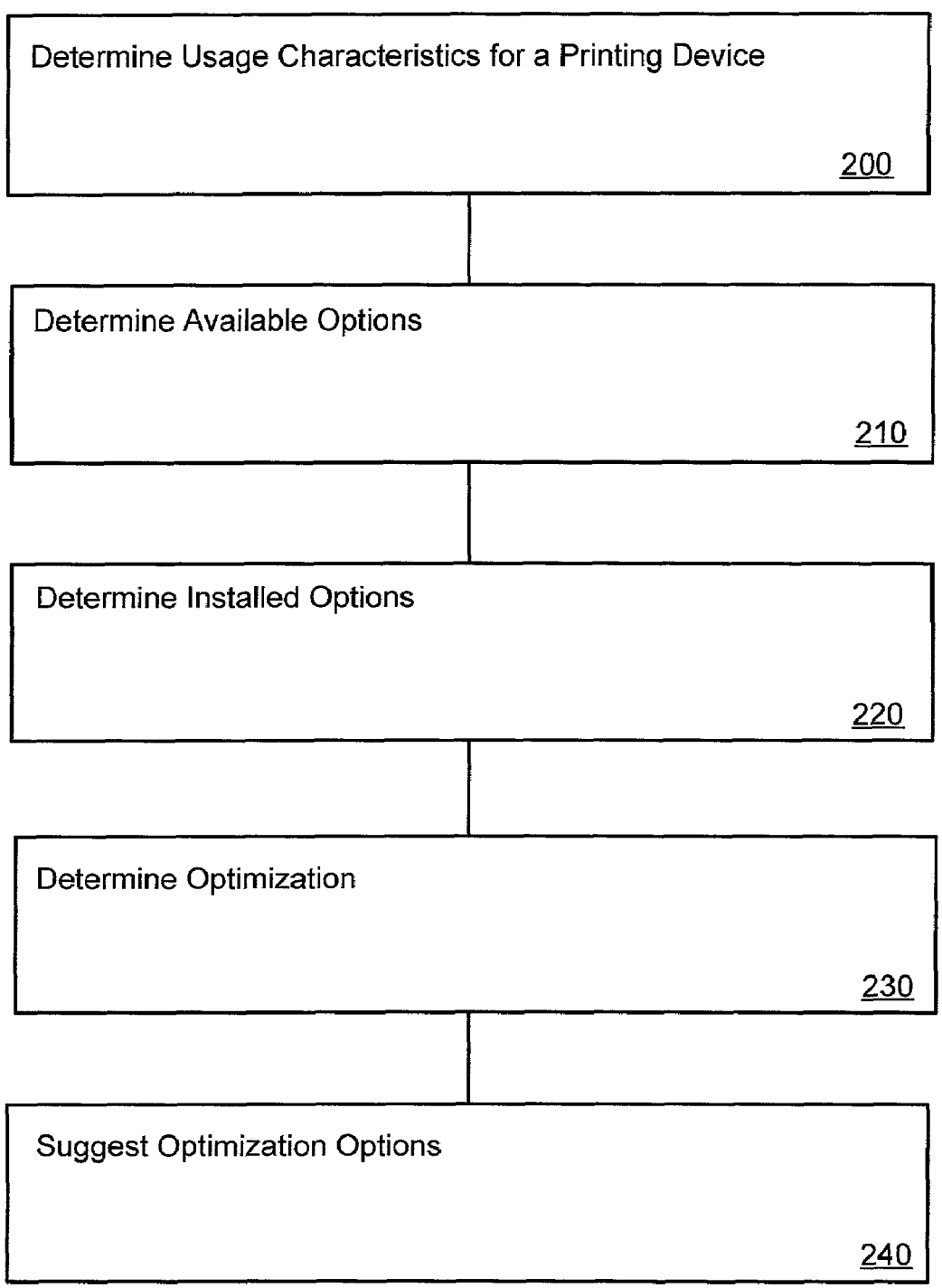
FIG. 2 illustrates a flow diagram of the steps that may be used to carry out the various embodiments of the present invention.

In one embodiment of the present invention, an optimization program 170 for suggesting printing device options may be installed on a network administrator computer system 160. The optimization program 170 may perform a number of different tasks. Based upon the outcome of the tasks, the optimization program 170 may suggest printing device 110 options for improving the functionality and optimization of the network computer system 100. A flow diagram of the various tasks that may be performed by the optimization program 170 are illustrated in FIG. 2.

The optimization program 170 may first determine the usage characteristics 200 of one or more printing devices 110 in the network computer system 100. In order to recommend changes to optimize the functionality of the printing devices 110, the optimization program 170 must also determine the available options 210 for each of the printing devices 110. Furthermore, the optimization program 170 may determine the installed options 220 already present on a particular printing device 110. The optimization program 170 may use the information about the available options and the installed options to determine what additional options may be added to a particular printing device 110 to optimize its performance. Once the usage characteristics and potential options are determined, the optimization program 170 may determine the optimization 230 for a particular printing device. The determined optimization 230 for a printing device 110, or a group of printing devices 110, may then be used to suggest optimization options 240 to a network administrator or other user.

The determination of the usage characteristics 200 of one or more printing devices 110 may be accomplished in a number of different ways. In one embodiment, the optimization program 170 may include functions for querying individual printing devices 110 to determine characteristics such as paper usage rates, toner usage rates, power usage, numbers of received print jobs, and the like. Optionally, the optimization program 170 may continually monitor and keep track of the usage characteristics of individual printing devices 110 or groups of printing devices 110. This data may also be saved for later use.

In another embodiment, the optimization program 170 may determine usage characteristics 200 by querying a device management program 162 for printing device 110 usage characteristic data previously collected by the device management program 162. In many instances, a device management program 162, such as Web JetAdmin, monitors a network computer system 100 and collects printing device usage information. Such data collection may be set-up as a normal routine for the device management program 162. When such information is readily available, it may be more efficient for optimization program 170 to use the data collected by the device management program 162 to perform the tasks associate with optimization program 170 instead of using optimization program 170 to perform the same work.

In yet another embodiment for determining usage characteristics 200, the optimization program 170 may obtain information about printing device 110 usage characteristics from a program other than the device management program 162. For instance, a device management program 162 operating on a network computer system 100 may not include the capabilities for collecting printing device 110 usage data. A separate program, however, dedicated to collecting printing device usage data may continuously update a database of usage data for each printing device 110 and groups of printing devices 110. This data may be retrieved by the optimization program 170 and used to determine the usage characteristics 200 of the printing devices 110.

Usage characteristics 200 may also be determined by a printing device 110 and communicated to an optimization program 170. For example, a printing device 110 may include programming for monitoring usage characteristics such as consumable use per job rate, print job quantities, peak times for print jobs, or other such information. The printing device 110 may communicate any received information to an optimization program on a regularly scheduled basis.

The optimization program 170 may determine the available printing device options 210 in any number of ways. In one instance, a network administrator may create a database for storing information about the make or model of each printing device 110, and all of the options available for each printing device 110, at the time the optimization program is installed. Information about the additional printing devices 110 could be added to the database as additional printing devices 110 are added to the network computer system 100. Thus, the optimization program 170 could query the database to determine the available printing device options 210.

Alternatively, the optimization program 170 may query each printing device 110 to determine the options available 210 for each printing device 110. To accomplish this, the optimization program 170 must be able to query a printing device 110 for a list of available options. Some printing devices 110 may store a list of available options in a memory of the printing device 110, thereby facilitating a query by the optimization program 170.

In another embodiment of the present invention, the optimization program 170 may determine the make or model of a particular printing device 110 from a database or by querying the printing device 110. Based upon the make or model of the printing device 110, optimization program 170 may query a web site through an Internet 900 connection to determine the available options 210 for the printing device 110. For instance, a printing device manufacturer, such as Hewlett-Packard®, may maintain a web site on a remote computer 190 for providing information about a printing device 110. The information may include a list of available options that may be incorporated with a printing device 110. The optimization program 170 may query the web site to determine what options are available for a printing device 110. A list of available options may be sent by the web-site on the remote computer 190 to the optimization program 170.

The optimization program 170 may determine installed options 220 for a particular printing device 110 from a database set-up by a network administrator. The installed options may be determined 220 from a database in the same manner that the available options may be determined 210. Alternatively, the optimization program 170 may query a printing device 110 to determine if any options are installed on the printing device 110.

In yet another embodiment of the present invention, a printing device 110 may be programmed to provide an optimization program 170 with scheduled updates of information about the available options and installed options present on printing device 110. For instance, an optimization program 170 may determine the available options 210 and the installed options 220 for a printing device 110 from information passed to the optimization program 170 on a regular basis. A printing device 110 may include programming that causes the printing device 110 to send updates about the printing device 110 options to an optimization program 170 on a weekly, bi-weekly, or other scheduled basis.

Determining the optimization 230 for a particular printing device 110 may depend on the characteristics of a particular printing device 110 or on the characteristics of a group of printing devices 110. At times it may be desirable to optimize only a single printing device 110. For instance, if the optimization program 170 determines that a particular printing device 110 is heavily used, and that the printing device may be equipped with a high capacity feeder, the optimization program 170 may suggest that a high capacity feeder is added as an option to that printing device 110. If it is more important to optimize a group of printing devices 110, the optimization program 170 may make a different suggestion. For example, a printing device 110 experiencing heavy usage may be located near another printing device 110 that may not be experiencing as much usage. If the less used printing device 110 is already equipped with a high capacity feeder, the optimization program 170 may suggest swapping the two printing devices 110 or encouraging users to print to the printing device 110 already equipped with the high capacity feeder.

Based upon all of the information obtained, an optimization program 170 may suggest various printing device 110 configurations. This may include suggestions for adding paper handling devices adding additional network devices, using a toner miser function, turning on a job retention memory, and suggesting other printing device configurations. Suggestions for moving printing devices 110, for routing print jobs to other printing devices 110, or for adding additional services to the various printing devices 110 may also be made by the optimization program 170. Some service suggestions may include adding a maintenance service, initiating a charge per page service, using a printing device monitoring service, or other available services.

Suggestions recommend by optimization program 170 may be based on parameters input by a network administrator into the optimization program 170. Using fuzzy logic, or other calculations, the optimization program 170 may make one or more suggestions that may be used to optimize printing device 110 usage.

The optimization program 170 may suggest optimization options 240 automatically, or upon query by a user. If the optimization program 170 continually operates and monitors a network computer system 100 suggestions for optimization may be broadcast to a network administrator on a continual basis, or according to a defined time schedule. Optionally, the optimization program 170 may be used infrequently and a suggestion may be made on data collected over a particular time period. For example, a network administrator may execute the optimization program 170 once a month to obtain optimization suggestions based upon usage information or data collected during that particular month. Thus, the optimization program 170 may be tailored to the needs and time schedule of a network administrator monitoring a network computer system 100.

Although the particular steps executed by the optimization program 170 are described in a particular order, it is understood that the steps may occur during different time intervals and that the particular steps need not be performed in any particular order.

In an alternate embodiment of the present invention, the functions and operations of the optimizations program 170 may be incorporated into a device management program 162, such as Hewlett-Packard's® Web JetAdmin program. Device management programs 162 commonly monitor the usage characteristics of printing devices 110 connected to a network computer system 100. The addition of the optimization program 170 functionality with a device management program 162 provides additional features to the device management program 162. Therefore, a network administrator could call a function within a device management program that may perform all of the steps of the optimization program 170. The integration of the optimization program 170 with a device management program 162 may provide a more robust device management program 162 and improved control over the optimization of printing device 110 usage on a network computer system 100.

Having thus described certain preferred embodiments of the present invention, it is to be understood that the invention defined by the appended claims is not to be limited by particular details set forth in the above description, as many apparent variations thereof are possible without departing from the spirit or scope thereof as

What is claimed is:

1. A method for improving use of printing devices in a network computer system, comprising:
   determining usage characteristics of at least one printing device;
   determining all options available for said at least one printing device, said available options including paper handling, consumable, servicing, print processing, configuration, software, and hardware options for said at least one printing device;
   determining all installed options currently existing on said at least one printing device, said installed options including paper handling, consumable, servicing, print processing, configuration, software, and hardware options of said at least one printing device; and
   determining a set of optimal options for said at least one printing device based on said usage characteristics, said available options and said installed options.

2. The method of claim 1, further comprising suggesting at least one change to said at least one printing device for optimizing the use of said at least one printing device with said network computer system.

3. The method of claim 2, wherein said suggesting at least one change to said at least one printing device for optimizing the use of said at least one printing device with said network computer system comprises suggesting an option selected from the group consisting of using a toner miser function, turning on a job retention memory, and suggesting other printing device configurations.

4. The method of claim 1, wherein said determining the usage characteristics of at least one printing device comprises determining the usage characteristics of all printing devices operating on said network computer system.

5. The method of claim 1, wherein said determining the usage characteristics of at least one printing device comprises monitoring said at least one printing device to determine said usage characteristics.

6. The method of claim 1, wherein said determining the usage characteristics of at least one printing device comprises retrieving said usage characteristics from a database.

7. The method of claim 1, wherein said determining the usage characteristics of at least one printing device comprises determining at least one usage characteristic selected from the group consisting of paper use rate, toner use rate, power use rate, time of print job request, consumable use per job rate, and print job request rate.

8. The method of claim 1, wherein said determining all options available for said at least one printing device comprises retrieving said available options from a database.

9. The method of claim 1, wherein said determining all options available for said at least one printing device comprises querying said at least one printing device to retrieve said available options.

10. The method of claim 1, wherein said determining all options available for said at least one printing device comprises querying a web-site for said available options.

11. The method of claim 1, wherein said determining all installed options currently existing on said at least one printing device comprises retrieving said installed options from a database.

12. The method of claim 1, wherein said determining all installed options currently existing on said at least one printing device comprises querying said at least one printing device to retrieve said installed options.

13. The method of claim 1, wherein said determining a set of optimal options for said at least one printing device based on said usage characteristics, said available options and said installed options comprises using fuzzy logic to determine said set of optimal options for said at least one printing device.

14. The method of claim 1, further comprising suggesting at least one service to incorporate with said at least one printing device for providing enhanced usage of said at least one printing device.

15. The method of claim 14, wherein said suggesting at least one service to incorporate with said at least one printing device comprises suggesting at least one service selected from the group consisting of a maintenance service, a charge per page service, and a printing device monitoring service.

16. A method for suggesting printing device options in a network computer system, comprising:
   operating a device management program on a computer connected to a network communication;
   determining usage characteristics including an amount and type of use of at least one printing device with said device management program;
   operating a computer program on said computer;
   using said computer program to determine all options available for said at least one printing device, said available options including paper handling, consumable, servicing, print processing, configuration, software, and hardware options for said at least one printing device;
   using said computer program to determine all installed options present on said at least one printing device, said installed options including paper handling, consumable, servicing, print processing, configuration, software, and hardware options of said at least one printing device; and
   using said computer program to determine an optimal set of options for said at least one printing device based on said usage characteristics, said available options and said installed options.

17. The method of claim 16, wherein said using said computer program to determine all options available for said at least one printing device comprises:
   connecting to the Internet; and querying a web-site for information about said at least one printing device.

18. The method of claim 16, wherein said computer program is configured to communicate with said device management program.

19. The method of claim 16, wherein said computer program is a component of said device management program.

20. The method of claim 16, wherein using said computer program to determine an optimal set of options for said at least one printing device comprises using said computer program to compare said installed options with said available options.

* * * * *